United States Patent
Shaffer et al.

(10) Patent No.: US 7,035,734 B2
(45) Date of Patent: Apr. 25, 2006

(54) METHOD AND SYSTEM FOR COMMUNICATING NAVIGATION INFORMATION

(75) Inventors: Shmuel Shaffer, Palo Alto, CA (US); Gebran G. Chahrouri, Menlo Park, CA (US); Joseph F. Khouri, San Jose, CA (US); Bich Tu Nguyen, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 112 days.

(21) Appl. No.: 10/732,725

(22) Filed: Dec. 10, 2003

(65) Prior Publication Data

US 2005/0131643 A1 Jun. 16, 2005

(51) Int. Cl.
*G01C 21/26* (2006.01)
*G01C 21/30* (2006.01)

(52) U.S. Cl. ............... 701/210; 701/201; 701/211; 340/995.12; 340/995.13; 340/995.23

(58) Field of Classification Search ............ 701/210, 701/201, 208, 209, 211; 340/995.23, 995.12, 340/995.13, 995.19, 995.25; 455/414.2, 455/414.3, 456.1, 456.2
See application file for complete search history.

(56) References Cited

U.S. PATENT DOCUMENTS

| | | | | |
|---|---|---|---|---|
| 5,892,463 A | * | 4/1999 | Hikita et al. | 340/995.13 |
| 5,928,307 A | * | 7/1999 | Oshizawa et al. | 701/210 |
| 6,178,379 B1 | | 1/2001 | Dwyer | 701/205 |
| 6,202,024 B1 | * | 3/2001 | Yokoyama et al. | 701/207 |
| 6,292,743 B1 | | 9/2001 | Pu et al. | 701/202 |
| 6,297,770 B1 | | 10/2001 | Ueda et al. | 342/357.12 |
| 6,405,130 B1 | * | 6/2002 | Piwowarski | 701/210 |
| 6,415,227 B1 | | 7/2002 | Lin | 701/213 |
| 6,611,756 B1 | | 8/2003 | Chen et al. | 701/213 |
| 6,629,035 B1 | | 9/2003 | Seto et al. | 701/208 |
| 6,801,519 B1 | * | 10/2004 | Mangal | 370/349 |
| 2004/0034464 A1 | * | 2/2004 | Yoshikawa et al. | 701/117 |
| 2004/0049343 A1 | * | 3/2004 | Yamadaji et al. | 701/301 |
| 2005/0065717 A1 | * | 3/2005 | Mueller et al. | 701/201 |

OTHER PUBLICATIONS

Hertz NeverLost®, "*In-Car Navigation System Guides You Wherever You Want to Go*", http://www.hertz.com/byr/whyhertz/byrwhyhertzneverlost.jsp, ©2003, The Hertz Corporation, 3 pages.
PCT Search Report for PCT/US04/37694, 9 pages.

* cited by examiner

*Primary Examiner*—Tan Q. Nguyen
(74) *Attorney, Agent, or Firm*—Baker Botts L.L.P.

(57) ABSTRACT

A method for communicating navigation information includes receiving destination information from a user. The destination information comprises a desired destination of the user. The method includes determining a first route to the destination and communicating the first route to the user. The method includes monitoring position information of a plurality of vehicles and identifying an area causing traffic delay using the position information of the plurality of vehicles. The method also includes determining a second route to the destination to avoid the area and communicating the second route to the user.

65 Claims, 2 Drawing Sheets

METHOD AND SYSTEM FOR COMMUNICATING NAVIGATION INFORMATION

TECHNICAL FIELD OF THE INVENTION

The present invention relates generally to communication systems and, more particularly, to a method and system for communicating navigation information.

BACKGROUND OF THE INVENTION

Navigation systems, such as OnStar and NeverLost, found in many vehicles guide the vehicle operator from a current vehicle location to the operator's specified destination using telematics. Drivers may get derailed off the navigation system's prescribed route for various reasons. For example, instructions may not be clear or may not be easy to follow, temporary road closure or street construction may occur or newly constructed bridges and tunnels may not yet have been programmed into the navigation system. Existing systems work in an open loop wherein a global positioning system (GPS) position is provided to the navigation system, and each trip is an experience isolated from other experiences and drivers. Some existing systems are able to identify a vehicle's position and recognize when the vehicle is off course from a prescribed route. The systems can then recalculate a route from the vehicle's current off course position to a user's desired destination.

SUMMARY OF THE INVENTION

The present invention provides a method and system for communicating navigation information that substantially eliminates or reduces at least some of the disadvantages and problems associated with previous methods and systems.

In accordance with a particular embodiment of the present invention, a method for communicating navigation information includes receiving destination information from a user. The destination information comprises a desired destination of the user. The method includes determining a first route to the destination and communicating the first route to the user. The method includes monitoring position information of a plurality of vehicles and identifying an area causing traffic delay using the position information of the plurality of vehicles. The method also includes determining a second route to the destination to avoid the area and communicating the second route to the user.

In particular embodiments, identifying an area causing traffic delay using the position information of the plurality of vehicles may comprise identifying an area causing traffic delay based on route diversions of the plurality of vehicles. The second route may be determined when a threshold amount of route diversions of the plurality of vehicles are identified. The method may also include communicating to a number of users respective routes that include the area causing traffic delay and monitoring position information of the number of users to determine when traffic delay is reduced in the area.

The method may also include receiving second destination information from a second user. The second destination information comprising a desired destination of the second user. The method may include determining a third route to the second destination, communicating the third route to the second user and determining a fourth route to the second destination to avoid the area. The method may also include prioritizing when to communicate the second route to the user or the fourth route to the second user based on respective positions of the user and the second user. The area causing traffic delay may comprise a construction area, a traffic accident or at least a temporary closure of at least a portion of a road.

In accordance with another embodiment, a system for displaying navigation information comprises a mobile navigation system comprising an interface operable to receive destination information from a user. The destination information comprises a desired destination of the user. The system includes a central navigation server wirelessly coupled with the mobile navigation system. The central navigation server is operable to determine a first route to the destination. The interface is further operable to communicate the first route to the user. The central navigation server is further operable to monitor position information of a plurality of vehicles, identify an area causing traffic delay using the position information of the plurality of vehicles and determine a second route to the destination to avoid the area. The interface is also operable to communicate the second route to the user. In particular embodiments, the mobile navigation system may determine the second route to the destination to avoid the area based on information related to the area communicated from the central navigation server.

The central navigation server may be operable to identify an area causing traffic delay based on route diversions of the plurality of vehicles. The central navigation server may also be operable to determine the second route when a threshold amount of route diversions of the plurality of vehicles are identified.

Technical advantages of particular embodiments include a method and system for displaying vehicle navigation information that allows drivers to benefit from experiences of other drivers who have previously traversed a particular route. Two-way communication is provided between a mobile navigation system and a central navigation server to enable update at the mobile navigation system of traffic obstacle or delay information where a plurality of vehicles have diverged from prescribed routes. The central navigation server may also receive feedback regarding vehicles that are able to successfully and quickly pass through a previously-identified traffic delay area and update other vehicles accordingly. Accordingly, travel time and road congestion may be reduced for those driving along a particular route.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
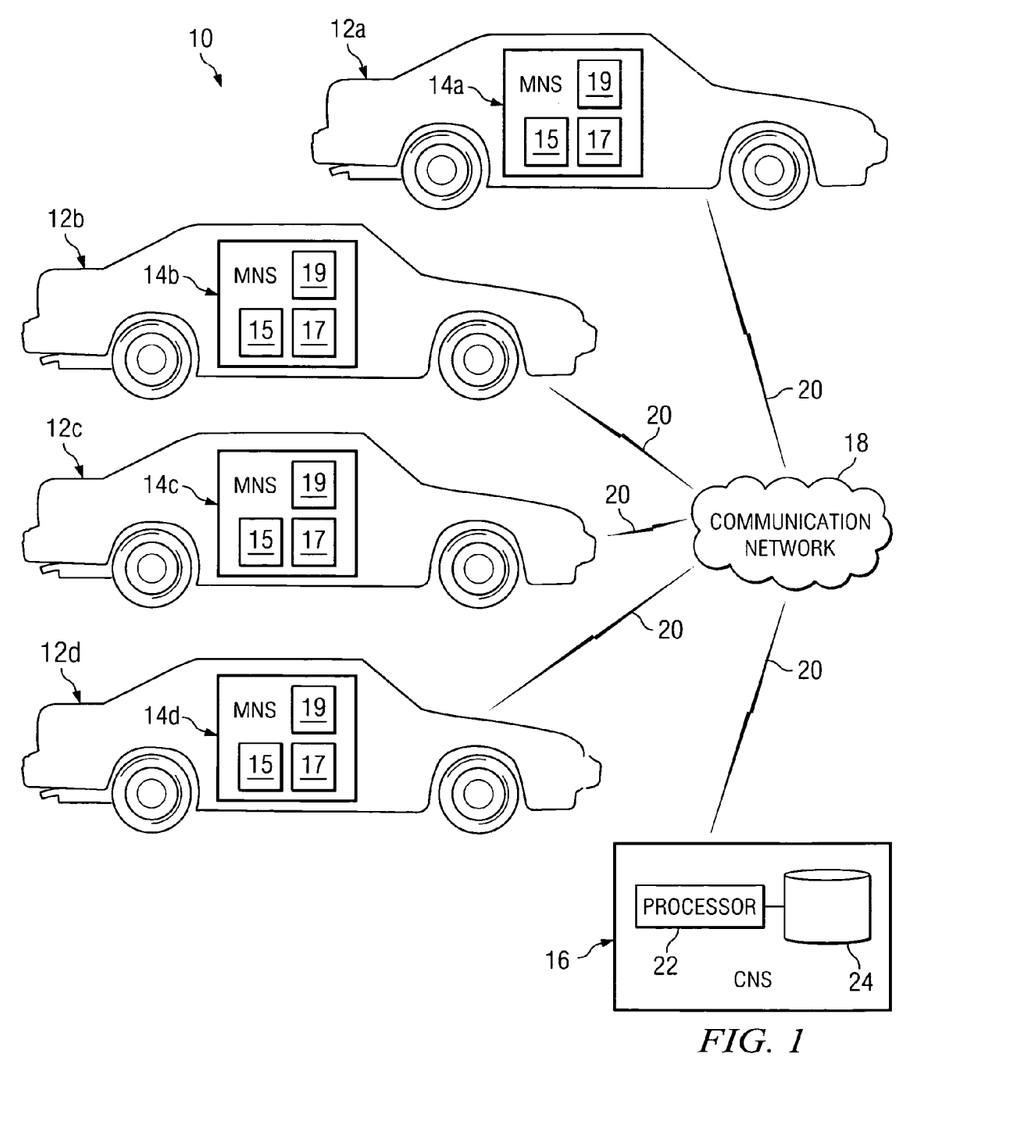
FIG. 1 illustrates a communication system for communicating navigation information, in accordance with a particular embodiment of the present invention.

FIG. 1 illustrates a communication system 10 for communicating navigation information, in accordance with a particular embodiment of the present invention. Communication system 10 includes a plurality of vehicles 12a–12d, each comprising a mobile navigation system (MNS) 14, and a central navigation server (CNS) 16. Each mobile navigation system 14 is able to establish two-way communication sessions with central navigation server 16 through communication network 18. Such communication may be established through communication links 20 which may comprise wireless and/or wireline communication links. In particular embodiments, communication system 10 utilizes internet protocol (IP) connectivity of internet-enabled vehicles or wireless connections. For example, each vehicle 12 may comprises a mobile IP network for communication with other components of system 10.

The teachings of the present invention provide a method and system for communicating navigation information that updates route information displayed at vehicles based on changing road and traffic conditions. Telematics may be utilized by central navigation server 16 and mobile navigation system 14 to provide a self-learning navigational communication system that adapts to changing road and traffic conditions in order to reduce travel time and road congestion based on information received regarding traffic delays caused by traffic accidents, construction, road closures or other traffic obstacles.

Communication network 18 may comprise one or more suitable communication networks, such as the Internet, through which communication may occur between mobile navigation systems 14 and central navigation server 16. For example, communication network 18 may include one or more wide area networks (WANs), local area networks (LANs), global distributed networks such as the Internet, Intranet, Extranet or any other form of wireless or wireline communication network. The term "communication network" should be interpreted as generally defining any network capable of transmitting audio and/or video telecommunication signals, data and/or messages.

Communication network 18 may include any combination of wireless, wireline or cellular communication segments or nodes. Nodes may include any combination of network components, gatekeepers, routers, hubs, switches, gateways, endpoints or other hardware, software or embedded logic implementing any number of communication protocols that allow for the exchange of information within and between components coupled with communication network 18.

In a particular embodiment, communication network 18 employs communication protocols that allow for the addressing or identification of endpoints, nodes, mobile navigation systems and/or a central navigation server coupled to communication network 18. For example, using IP, each of the components coupled together by communication network 18 in communication system 10 may be identified in information directed using IP addresses. In this manner, network 18 may support any form and/or combination of point-to-point, multicast, unicast or other techniques for exchanging media packets among components in communication system 10. Any network components capable of exchanging audio, video or other data using cells, frames or packets are included within the scope of the present invention. Communication network 18 may utilize IP over wireless and IP over cellular technology in communications between components of communication system 10. Communication network 18 may include and utilize existing wireless or cellular networks for such purpose. In addition to including one or more IP networks, communication network 18 may also include non-IP telecommunication networks through the use of interfaces or components, such as gateways.

Mobile navigation systems 14 are each operable to display or otherwise communicate to a user, such as a driver or passenger of a vehicle 12, route information, or directions, to a particular destination. Such display or other communication may occur through text, graphical images, audio and/or other suitable methods. The route information may be based upon a shortest distance or shortest time for travel from a particular origination location to the destination. The particular destination may be input and/or selected by the user at mobile navigation system 14 through a user interface 15, such as a keypad, of each mobile navigation system 14. In particular embodiments, a user may input and/or select a destination using another device, such as a personal digital assistant (PDA). In some embodiments, a user may input and/or select destination information using one or more spoken commands via speech recognition technology in mobile navigation system 14.

Each mobile navigation system 14 includes a transmitter/receiver 17 through which the current position of each vehicle 12 may be determined, either alone or in combination with central navigation server 16, using global positioning system (GPS) technology. Transmitter/receiver 17 obtains signals from GPS satellites or ground stations of communication network 18 in order to aid in position information determination. Each mobile navigation system 14 and central navigation server 16 may use vehicle position information and a vehicle destination input or selected by a user to determine route information for display or communication to the user at the vehicle's mobile navigation system 14. As indicated above, the route information may comprise directions from a vehicle's position, as determined when the destination is input into mobile navigation system 14, to the destination. Such directions may be based upon a shortest route, as measured by either distance, predicted travel time or otherwise. In particular embodiments, a user may input other requests to be used in determining route information for display, such as a desire to avoid interstate highways, traffic lights, smaller roads or other undesired elements.

In the illustrated embodiment, each mobile navigation system 14 includes a route calculation system 19 for determining the route information for communication to the user. Route information from a vehicle's position to a desired destination may be determined based on parameters or information downloaded to the mobile navigation system from central navigation server 16. This method of calculating route information at a vehicle's mobile navigation system may be referred to as distributed route calculation. In other embodiments route information may be determined at central navigation server 16 based on a user's desired destination and downloaded to a vehicle's mobile navigation system 14. This method of calculating route information at a central navigation server may be referred to as central route calculation. Embodiments of the present invention contemplate completely distributed route calculation, completely central route calculation and combinations of distributed and central route calculation for determining routes based on users' desired destinations.

Central navigation server 16 may include any combination of hardware, software and/or encoded logic and, in the illustrated embodiment, includes a processor 22 and a database 24. Processor 22 aids in performing functions of central navigation server 16 described herein and may comprise a microprocessor, controller or any other suitable computing device or resource. Database 24 collects and stores information used by central navigation server 16 and mobile navigation systems 14, such as route information, and may comprise any form of volatile or non-volatile memory including, without limitation, magnetic media, optical media, random access memory (RAM), read-only memory (ROM), removable media or any other suitable local or remote memory component. Components of central navigation server 16 may be centrally located (local) with respect to one another, or distributed throughout communication network 18 in particular embodiments.

As discussed above, in particular embodiments routes for various vehicles may be centrally calculated at central navigation server 16. Such calculation may be performed by processor 22. In other embodiments, central navigation server 16 may merely download parameters to mobile navigation systems 14 to be used in route calculation and determination. In this scenario, communication between central navigation server 16 and mobile navigation systems 14 may be reduced since it does not require download of entire routes to each mobile navigation system 14. Moreover, this scenario also provides better scaling since route calculation is performed in a distributed manner.

While traveling along the route displayed to the user by the user's mobile navigation system 14, various incidents may arise that cause traffic jams or other delays that affect the ability of the user to easily or quickly reach the user's destination. For example, unforeseen construction or traffic accidents may occur that tie up traffic and delay vehicles whose navigation system routes take them through or near such construction or accidents. Areas that cause traffic delay may include areas where vehicular traffic is tied up, impassable or otherwise diverged from normal flow from construction, traffic accidents, obstacles or otherwise. Such areas may be referred to herein as "hot spots." Hot spots may cause drivers to diverge off of a route communicated by the drivers' mobile navigation systems 14 in order to decrease delay in reaching destinations. In particular embodiments, hot spots may be temporary and may be cleared up at some point in the future (e.g., in the case of traffic accidents).

For example, a particular route may direct a driver to travel along a particular interstate. The driver may encounter a traffic jam caused by a traffic accident or construction on the interstate. As a result, the driver may exit the interstate in an effort to bypass the traffic jam and decrease delay. Such exiting may comprise a diversion from the route originally displayed at the mobile navigation system 14 of the driver's vehicle 12. Since the position of the driver's vehicle 12 may be monitored by the vehicle's mobile navigation system 14 and the central navigation server 16, the vehicle's mobile navigation system 14 and the central navigation server 16 can determine when the driver's vehicle 12 has diverged from the particular route communicated to the driver. Central navigation server 16 will likewise also know if one or more other vehicles 12 make such a diversion from a respective route to respective destinations of the vehicles. Moreover, even in the event that certain vehicles 12 are not traveling along a route communicated by a mobile navigation system, central navigation server 16 may still be able to determine and identify (based on positioning information of mobile navigation systems 14) a particular hot spot based on traffic speeds and/or congestion around the hot spot or a high or inordinate number of vehicles exiting at a certain location as compared to normal traffic patterns. It should be understood that monitoring of position information of vehicles by central navigation server 16 may include monitoring of position information over time, for example, to monitor vehicular speed and traffic flow.

Central navigation server 16 may collect and store, at database 24, information relating to traffic congestion or delays around hot spots (through identification of route diversions or otherwise) in order to modify routes communicated to drivers through mobile navigation systems 14 or to determine alternate routes for communication to the drivers. For example, routes may be modified or alternate routes may be created for all vehicles whose original route takes them through or near a hot spot. Such modified or alternate routes may be downloaded to mobile navigation systems 14 of such vehicles for communication to drivers. In particular embodiments, mere parameters related to areas causing traffic delay may be downloaded to mobile navigation systems 14 which then calculate modified or alternate routes based on such parameters.

The determination of the modifications to make to a route or a particular alternate route may utilize various factors, such as traffic flow and speeds, size of hot spot and capacity of potential roads to be included in the modified or new route. For example, speed may be a factor for a truck driver trying to make an on-time delivery when deciding between alternate routes, one or more of which may include a hot spot. In some cases, central navigation server 16 may test multiple routes to decrease delay from a hot spot by sending different modified routes to different vehicles and monitoring the progress of the vehicles to determine which may be the better (e.g., faster) route. Such testing of multiple routes may also occur when initially communicating routes to users, independent of a hot spot occurrence.

In particular embodiments, routes may be modified or alternate routes may be determined only when a particular threshold number or percentage of route diversions have occurred. For example, it is expected that some drivers may diverge from a route in order to obtain gas or food or to otherwise take a break. These types of diversions may not occur as a result of a traffic hot spot. Thus, central navigation server 16 may require that a particular threshold number or percentage be reached to reduce the chance that diversions not based on traffic hot spots trigger the modification of routes or the calculating of new routes.

In some cases, central navigation server 16 may prioritize particular mobile navigation systems 14 that receive modified or alternate route information or parameters relating to hot spots, as applicable, since many vehicles may be traveling on routes that include a hot spot. For example, vehicles 12 closer to a particular hot spot may receive modified or alternate routes or hot spot parameters, as applicable, before vehicles that may be further away from the hot spot and associated delay. In some cases, vehicles that are already stuck in a particular traffic jam may not receive the modified or alternate route information or hot spot parameters since they may be passed the point of being able to take advantage of it.

In particular embodiments, the collection and storing of route diversion information may indicate a flaw in the communicated route information. For example, if a certain number of vehicles continuously stray off course at a certain location, it may be as a result of unclear of incorrect directions (e.g., an unidentified roadway that vehicles may be taking for an easier route to a destination). In these situations, local authorities may be contacted to confirm roadway and map information used in calculating routes.

Future routes may be calculated according to new information received from the local authorities. In some embodiments, route information may be automatically updated without contacting local authorities based on observation that a certain number of vehicles took an alternate route or otherwise continuously strayed off course at a certain location.

In particular embodiments, automatic or manual contact may be made with local authorities proximate to a particular hot spot in order to obtain information regarding detours and road conditions to determine whether alternate routes should be calculated or existing routes should be modified for vehicles. Such contact may comprise contact by an administrator of central navigation server 16 with the local authorities. For example, upon identification of a particular hot spot, local authorities may be called to visit the hot spot to determine how long traffic might be congested at the hot spot. Physical agents may also be sent to determine the cause of similar route diversions by a plurality of vehicles, such as a road closure or obstacle. Map and route information may then be updated accordingly in central navigation server 16.

As an example in operation, vehicles 12a–12d may each be traveling on a respective route displayed by respective mobile navigation systems 14a–14d. Such routes may include travel on a particular highway. A traffic accident may occur on the highway, tying up traffic for an extended distance prior to the accident. Vehicles 12a–12c may reach the traffic jam at approximately the same time and may exit the highway in order to minimize delay caused by the traffic accident. At this time, vehicle 12d may still be a considerable distance away from the traffic jam. The exiting of the highway by vehicles 12a–12c is a diversion of each respective route displayed by mobile navigation systems 14a–14c. Since the positions of vehicles 12 are monitored by central navigation server 16 through mobile navigation systems 14a–14c, central navigation server 16 identifies the route diversions and may determine that some incident is causing such diversions, if, for example, the number of total vehicle diversions reaches a certain threshold. If such determination is made, then central navigation server 16 may modify the original route displayed at mobile navigation system 14d of vehicle 12d to increase the chances that vehicle 12d avoids the traffic jam and associated delay. Such modification may include instructing vehicle 12d to exit at the same exit at which vehicles 12a–12c exited or some other modification. In some cases, the modification may instruct vehicle 12d to exit at an exit ahead of the exit at which vehicles 12a–12c exited. This may provide 12d a modified route with even less traffic and/or delay. In particular embodiments, central navigation server 16 may calculate a new route for vehicle 12d to reach its desired destination.

It should be understood that once an area causing traffic delay is identified, an initial route to a selected destination communicated to a vehicle may be determined so as to avoid the area even though the route would typically include the area if no delay existed. The route avoiding the area may be calculated at a central navigation server and communicated to a vehicle's mobile navigation system or may be calculated at the vehicle's mobile navigation system based on parameters of the area downloaded from a central navigation server. In the example above concerning vehicles 12a–12d, calculation of initial routes to selected destinations for additional vehicles may be undertaken to specifically avoid the area causing the diversions of vehicles 12a–12c even though routes to such selected destinations for the additional vehicles might include the area under normal traffic conditions.

In particular embodiments utilizing distributed route calculation, central navigation server 16 may be notified by each mobile navigation system 14a–14c that their respective vehicles have diverted from their prescribed routes. In response, central navigation server 16 may download hot spot parameters to mobile navigation system 14d of vehicle 12d such that a modified or new route may be calculated by route calculation system 19 of mobile navigation system 14d.

In some embodiments, central navigation server 16 monitors and collects position information from mobile navigation systems 14 to determine when vehicles successfully go through an identified hot spot with reduced or no delay. Those vehicles may include vehicles traveling on a prescribed modified route that bypassed the hot spot or vehicles not traveling along any prescribed route communicated by its mobile navigation system. Based on such information, central navigation server 16 can determine when it is appropriate to discontinue the modification or recalculation of routes traveling through or near the hot spot. In some embodiments, central navigation server 16 may download a corrected route (that does not include a detour around a hot spot) to only to a subset of vehicles and may monitor the success rate of the vehicles as they navigate through the previously-identified hot spot. When a certain number of percentage of vehicles successfully complete the corrected route, central navigation server 16 may update route information to all other mobile navigation systems so that other vehicles may travel on a route that includes travel through or near the hot spot.

In particular embodiments, a user of a mobile navigation system 14 may use interface 15 to inform its mobile navigation system 14 and central navigation server 16 of the existence of a particular road condition, such as an accident, detour, construction or other condition which may cause a hot spot. Central navigation server 16 may use this information in determining modifications or route calculations for users of the same or other mobile navigation systems 14.

Central navigation server 16 and mobile navigation systems 14 may also be configured, either alone or in combination, to generate transaction and history reports indicating hot spots and traffic flow histories.

It will be recognized by those of ordinary skill in the art that mobile navigation systems 14 and central navigation server 16 may be any combination of hardware, software and/or encoded logic that provides communication services to a user, such as a driver or passenger of a vehicle 12. Moreover, while one central navigation server 16 is illustrated, it should be understood that communication system 10 may include a plurality of networked or cooperating central navigation servers 16 in particular embodiments. Such plurality of central navigation servers may separately or in combination perform the functions of central navigation server 16 described herein.

Particular embodiments also contemplate that central navigation server 16 may identify areas that improve traffic flow based on monitored position information (including speed) of vehicles. For example, an opening of a previously-closed or new highway or other roadway may cause vehicles to divert from a prescribed route in order to more quickly reach their destinations. Central navigation server 16 may determine that such diversion (e.g., onto a new roadway) provides a quicker or easier route to a destination. Central navigation server 16 may then update or calculate new routes of other vehicles to include the area that improves traffic flow or may communicate parameters of such area to mobile navigation systems 14 of vehicles so that the mobile navigation systems may calculate a new or modified route to include the area.

Figure 2:
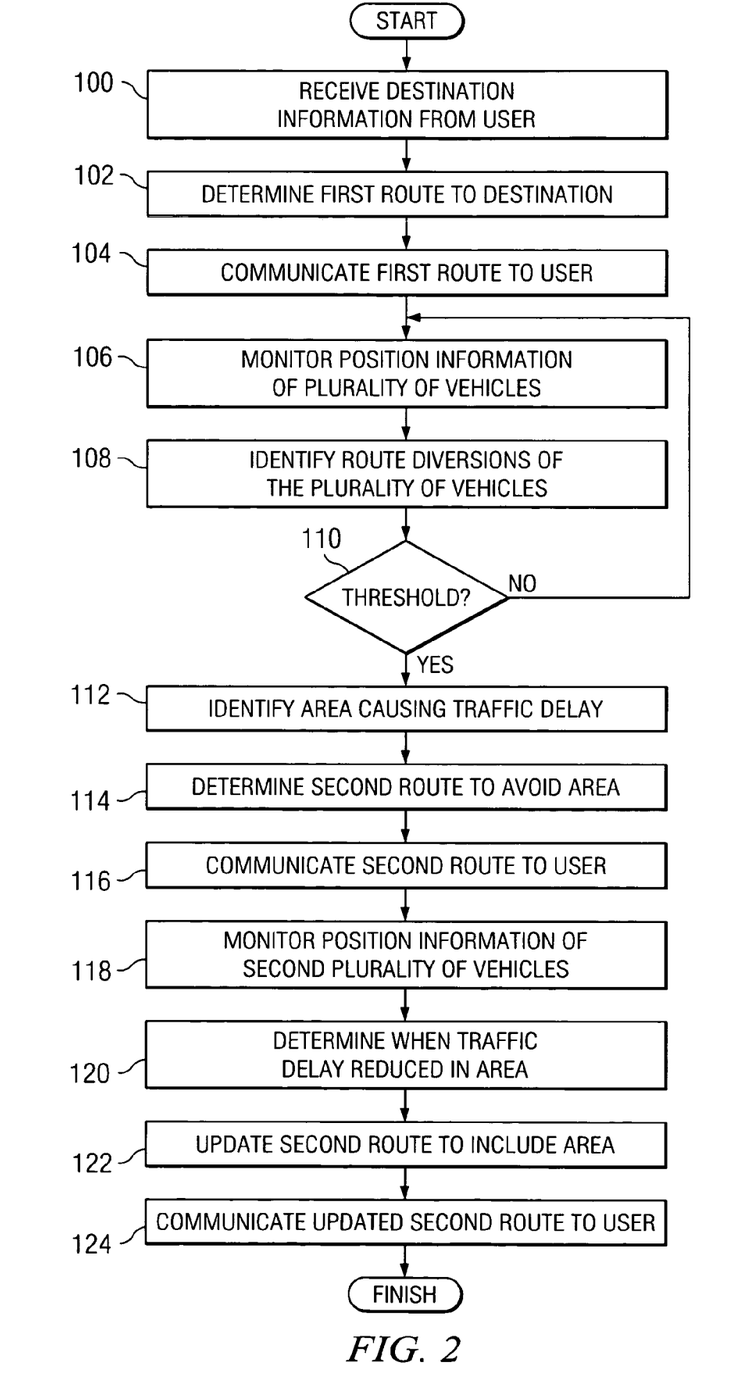
FIG. 2 is a flowchart illustrating a method for communicating navigation information, in accordance with a particular embodiment of the present invention.

FIG. 2 is a flowchart illustrating a method for communicating navigation information, in accordance with a particular embodiment of the present invention. The method begins at step 100 where destination information is received from a user. The destination information may comprise a desired destination for the user and may be received at a mobile navigation system of the user's vehicle through a keypad interface or other method. In particular embodiments, the destination information may be received through the user's PDA, e-mail, cell phone or otherwise or through the user's voice using speech recognition technology. At step 102, a first route is determined to the user's destination. The first route may be determined according to particular desires of the user, such as a desire for the shortest route in estimated time or distance. Map and geography information of the user's mobile navigation system, a central navigation server or otherwise may be used in determining the first route. At step 104, the first route is communicated to the user, for example, by display or audio at the user's mobile navigation system.

At step 106, position information of a plurality of vehicles is monitored. Such monitoring may be accomplished through GPS technology. The plurality of vehicles may each include respective mobile navigation systems. At step 108, route diversions of the plurality of vehicles are identified. Such route diversions may include diversions from routes prescribed by mobile navigation systems of the plurality of vehicles.

At step 110, it is determined whether the identified route diversions reach a threshold amount. Such threshold amount may comprise a certain number of route diversions based on typical traffic patterns during a certain time of day or a certain percentage of route diversions based on overall traffic at the time. If the identified route diversions do not exceed the threshold, then the method returns to step 106 where the monitoring of position information of a plurality of vehicles continues. If the identified route diversions meet or exceed the threshold, then the method proceeds to step 112 where an area causing traffic delay is identified. Such traffic delay may be caused by a traffic accident, temporary construction, a road closure or other traffic obstacle. In some embodiments, an area causing traffic delay may be identified based on traffic flow, vehicle speeds or congestion around an area or based on an inordinate number of vehicles exiting at a certain location instead of on diversions from routes communicated at a mobile navigation system. In such cases, steps 108 and 110 may not be utilized.

At step 114, a second route is determined for the user to reach the user's destination that avoids the area causing traffic delay. In some situations, such avoidance may still encounter some delay caused by the area (e.g., from extra traffic than normal on detour or bypass roads), but such delay is reduced from the delay that would be encountered by traveling the first route through or proximate the area causing traffic delay. Again, map or geography information of a mobile navigation system, central navigation server or other component may be utilized to determine the second route. At step 116, the second route is communicated to the user, through display at the user's mobile navigation system or otherwise.

At step 118, position information of a second plurality of vehicles is monitored to determine when traffic delay is reduced in the area. As indicated above, monitoring position information of vehicles may include monitoring position information over time, for example, monitoring vehicular speed and traffic flow. At step 120, such determination is made based on the position information of the second plurality of vehicles. This determination may be made by identifying when vehicles pass through the area with little or no delay. In some cases, a central navigation server may prescribe a route for some vehicles that includes the area causing traffic delay and monitor such vehicles to determine when the delay is significantly reduced or gone. When traffic delay is reduced in the area, the second route for the user is updated to include the area at step 122. This step may only occur if the user has not yet bypassed the area according to the originally determined second route. At step 124, the updated second route is communicated to the user.

Some of the steps illustrated in FIG. 2 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 10, including mobile navigation systems 14 and central navigation server 16, these elements may be combined, rearranged or positioned in order to accommodate particular routing architectures or needs. In addition, particular elements such as processor 22 and database 24 of central navigation server 16 may be provided as separate external components to central navigation server 16 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for communicating navigation information, comprising:
   receiving destination information from a user, the destination information comprising a desired destination of the user;
   determining a first route to the destination;
   communicating the first route to the user;
   monitoring position information of a plurality of vehicles;
   identifying an area causing traffic delay based on route diversions of the plurality of vehicles using the position information of the plurality of vehicles;
   determining a second route to the destination to avoid the area; and
   communicating the second route to the user.

2. The method of claim 1, wherein identifying an area causing traffic delay using the position information of the plurality of vehicles comprises identifying an area causing traffic delay based on speed of the plurality of vehicles.

3. The method of claim 1, wherein the second route comprises a modification of the first route.

4. The method of claim 1, wherein the area causing traffic delay comprises a construction area.

5. The method of claim 1, wherein the area causing traffic delay comprises a traffic accident.

6. The method of claim 1, wherein the area causing traffic delay comprises at least a temporary closure of at least a portion of a road.

7. The method of claim 1, further comprising:
communicating parameters relating to the area causing traffic delay to a mobile navigation system; and
wherein determining a second route to the destination comprises determining a second route to the destination at the mobile navigation system.

8. A method for communicating navigation information, comprising:
receiving destination information from a user, the destination information comprising a desired destination of the user;
determining a first route to the destination;
communicating the first route to the user;
monitoring position information of a plurality of vehicles;
identifying an area causing traffic delay using the position information of the plurality of vehicles;
determining a second route to the destination to avoid the area;
communicating the second route to the user;
communicating to a number of users respective routes that include the area causing traffic delay; and
monitoring position information of the number of users to determine when traffic delay is reduced in the area.

9. A method for communicating navigation information, comprising:
receiving destination information from a user, the destination information comprising a desired destination of the user;
determining a first route to the destination;
communicating the first route to the user;
monitoring position information of a plurality of vehicles;
identifying an area causing traffic delay using the position information of the plurality of vehicle;
determining a second route to the destination to avoid the area;
communicating the second route to the user;
monitoring position information of a second plurality of vehicles;
determining when the traffic delay is reduced in the area using the position information of the second plurality of vehicles;
updating the second route to the destination to include the area; and
communicating the updated second route to the user.

10. A method for communicating navigation information, comprising:
receiving destination information from a user, the destination information comprising a desired destination of the user;
determining a first route to the destination;
communicating the first route to the user;
monitoring position information of a plurality of vehicles;
identifying an area causing traffic delay using the position information of the plurality of vehicle;
determining a second route to the destination to avoid the area;
communicating the second route to the user;
receiving second destination information from a second user, the second destination information comprising a desired destination of the second user;
determining a third route to the second destination;
communicating the third route to the second user;
determining a fourth route to the second destination to avoid the area; and
prioritizing when to communicate the second route to the user or the fourth route to the second user based on respective positions of the user and the second user.

11. A system for displaying navigation information, comprising:
a mobile navigation system comprising an interface operable to receive destination information from a user, the destination information comprising a desired destination of the user;
a central navigation server wirelessly coupled with the mobile navigation system, the central navigation server operable to determine a first route to the destination;
the interface further operable to communicate the first route to the user;
the central navigation server further operable to:
monitor position information of a plurality of vehicles;
identify an area causing traffic delay based on route diversions of the plurality of vehicles using the position information of the plurality of vehicles; and
determine a second route to the destination to avoid the area; and
the interface further operable to communicate the second route to the user.

12. The system of claim 11, wherein the central navigation server is operable to determine the second route when a threshold amount of route diversions of the plurality of vehicles are identified.

13. The system of claim 11, wherein a central navigation server operable to identify an area causing traffic delay using the position information of the plurality of vehicles comprises a central navigation server operable to identify an area causing traffic delay based on speed of the plurality of vehicles.

14. The system of claim 11, wherein the second route comprises a modification of the first route.

15. The system of claim 11, wherein the area causing traffic delay comprises a construction area.

16. The system of claim 11, wherein the area causing traffic delay comprises a traffic accident.

17. The system of claim 11, wherein the area causing traffic delay comprises at least a temporary closure of at least a portion of a road.

18. A system for displaying navigation information, comprising:
a mobile navigation system comprising an interface operable to receive destination information from a user, the destination information comprising a desired destination of the user;
a central navigation server wirelessly coupled with the mobile navigation system, the central navigation server operable to determine a first route to the destination;
the interface further operable to communicate the first route to the user;
the central navigation server further operable to:
monitor position information of a plurality of vehicles;
identify an area causing traffic delay using the position information of the plurality of vehicles; and
determine a second route to the destination to avoid the area;
the interface further operable to communicate the second route to the user;

a plurality of additional mobile navigation systems each operable to communicate to a number of users respective routes that include the area causing traffic delay; and wherein the central navigation server is operable to monitor position information of the number of users to determine when traffic delay is reduced in the area.

19. A system for displaying navigation information, comprising:
a mobile navigation system comprising an interface operable to receive destination information from a user, the destination information comprising a desired destination of the user;
a central navigation server wirelessly coupled with the mobile navigation system, the central navigation server operable to determine a first route to the destination;
the interface further operable to communicate the first route to the user;
the central navigation server further operable to:
monitor position information of a plurality of vehicles;
identify an area causing traffic delay using the position information of the plurality of vehicles; and
determine a second route to the destination to avoid the area;
the interface further operable to communicate the second route to the user;
monitor position information of a second plurality of vehicles;
determine when the traffic delay is reduced in the area using the position information of the second plurality of vehicles;
update the second route to the destination to include the area; and
wherein the interface is operable to communicate the updated second route to the user.

20. A system for displaying navigation information, comprising:
a mobile navigation system comprising an interface operable to receive destination information from a user, the destination information comprising a desired destination of the user;
a central navigation server wirelessly coupled with the mobile navigation system, the central navigation server operable to determine a first route to the destination;
the interface further operable to communicate the first route to the user;
the central navigation server further operable to:
monitor position information of a plurality of vehicles;
identify an area causing traffic delay using the position information of the plurality of vehicles; and
determine a second route to the destination to avoid the area;
the interface further operable to communicate the second route to the user;
a second mobile navigation system wirelessly coupled with the central navigation server, the second mobile navigation system comprising a second interface operable to receive second destination information from a second user, the second destination information comprising a desired destination of the second user;
wherein the central navigation server is operable to determine a third route to the second destination;
wherein the second interface is operable to communicate the third route to the second user; and
wherein the central navigation server is operable to:
determine a fourth route to the second destination to avoid the area; and
prioritize when to communicate the second route to the user or the fourth route to the second user based on respective positions of the user and the second user.

21. A method for communicating navigation information, comprising:
receiving destination information from a user, the destination information comprising a desired destination of the user;
monitoring position information of a plurality of vehicles;
identifying an area causing traffic delay based on route diversions of the plurality of vehicles using the position information of the plurality of vehicles;
determining a route to the destination to avoid the area; and
communicating the route to the user.

22. The method of claim 21, wherein the route to the destination to avoid the area is determined when a threshold amount of route diversions of the plurality of vehicles are identified.

23. The method of claim 21, wherein identifying an area causing traffic delay using the position information of the plurality of vehicles comprises identifying an area causing traffic delay based on speed of the plurality of vehicles.

24. The method of claim 21, wherein the area causing traffic delay comprises a construction area.

25. The method of claim 21, wherein the area causing traffic delay comprises a traffic accident.

26. The method of claim 21, wherein the area causing traffic delay comprises at least a temporary closure of at least a portion of a road.

27. A method for communicating navigation information, comprising:
receiving destination information from a user, the destination information comprising a desired destination of the user;
monitoring position information of a plurality of vehicles;
identifying an area causing traffic delay using the position information of the plurality of vehicle;
determining a route to the destination to avoid the area;
communicating the route to the user;
monitoring position information of a second plurality of vehicles;
determining when the traffic delay is reduced in the area using the position information of the second plurality of vehicles;
updating the route to the destination to include the area; and
communicating the updated route to the user.

28. A system for communicating navigation information, comprising:
means for receiving destination information from a user, the destination information comprising a desired destination of the user;
means for determining a first route to the destination;
means for communicating the first route to the user;
means for monitoring position information of a plurality of vehicles;
means for identifying an area causing traffic delay based on route diversions of the plurality of vehicles using the position information of the plurality of vehicles;
means for determining a second route to the destination to avoid the area; and
means for communicating the second route to the user.

29. The system of claim 28, wherein the second route is determined when a threshold amount of route diversions of the plurality of vehicles are identified.

30. The system of claim 28, wherein means for identifying an area causing traffic delay using the position information of the plurality of vehicles comprises means for identifying an area causing traffic delay based on speed of the plurality of vehicles.

31. The system of claim 28, wherein the second route comprises a modification of the first route.

32. The system of claim 28, wherein the area causing traffic delay comprises a construction area.

33. The system of claim 28, wherein the area causing traffic delay comprises a traffic accident.

34. The system of claim 28, wherein the area causing traffic delay comprises at least a temporary closure of at least a portion of a road.

35. The system of claim 28, further comprising:
means for communicating parameters relating to the area causing traffic delay to a mobile navigation system; and
wherein means for determining a second route to the destination comprises means for determining a second route to the destination at the mobile navigation system.

36. A system for communicating navigation information, comprising:
means for receiving destination information from a user, the destination information comprising a desired destination of the user;
means for determining a first route to the destination;
means for communicating the first route to the user;
means for monitoring position information of a plurality of vehicles;
means for identifying an area causing traffic delay using the position information of the plurality of vehicles;
means for determining a second route to the destination to avoid the area;
means for communicating the second route to the user;
means for communicating to a number of users respective routes that include the area causing traffic delay; and
means for monitoring position information of the number of users to determine when traffic delay is reduced in the area.

37. A system for communicating navigation information, comprising:
means for receiving destination information from a user, the destination information comprising a desired destination of the user;
means for determining a first route to the destination;
means for communicating the first route to the user;
means for monitoring position information of a plurality of vehicles;
means for identifying an area causing traffic delay using the position information of the plurality of vehicles;
means for determining a second route to the destination to avoid the area;
means for communicating the second route to the user;
means for monitoring position information of a second plurality of vehicles;
means for determining when the traffic delay is reduced in the area using the position information of the second plurality of vehicles;
means for updating the second route to the destination to include the area; and
means for communicating the updated second route to the user.

38. A system for communicating navigation information, comprising:
means for receiving destination information from a user, the destination information comprising a desired destination of the user;
means for determining a first route to the destination;
means for communicating the first route to the user;
means for monitoring position information of a plurality of vehicles;
means for identifying an area causing traffic delay using the position information of the plurality of vehicles;
means for determining a second route to the destination to avoid the area;
means for communicating the second route to the user;
means for receiving second destination information from a second user, the second destination information comprising a desired destination of the second user;
means for determining a third route to the second destination;
means for communicating the third route to the second user;
means for determining a fourth route to the second destination to avoid the area; and
means for prioritizing when to communicate the second route to the user or the fourth route to the second user based on respective positions of the user and the second user.

39. Software embodied in a computer readable medium, the computer readable medium comprising code operable to:
receive destination information from a user, the destination information comprising a desired destination of the user;
determine a first route to the destination;
communicate the first route to the user;
monitor position information of a plurality of vehicles;
identify an area causing traffic delay based on route diversions of the plurality of vehicles using the position information of the plurality of vehicles;
determine a second route to the destination to avoid the area; and
communicate the second route to the user.

40. The medium of claim 39, wherein the second route is determined when a threshold amount of route diversions of the plurality of vehicles are identified.

41. The medium of claim 39, wherein code operable to identify an area causing traffic delay using the position information of the plurality of vehicles comprises code operable to identify an area causing traffic delay based on speed of the plurality of vehicles.

42. The medium of claim 39, wherein the second route comprises a modification of the first route.

43. The medium of claim 39, wherein the area causing traffic delay comprises a construction area.

44. The medium of claim 39, wherein the area causing traffic delay comprises a traffic accident.

45. The medium of claim 39, wherein the area causing traffic delay comprises at least a temporary closure of at least a portion of a road.

46. The medium of claim 39, wherein the code is further operable to:
communicate parameters relating to the area causing traffic delay to a mobile navigation system; and
wherein code operable to determine a second route to the destination comprises code operable to determine a second route to the destination at the mobile navigation system.

47. Software embodied in a computer readable medium, the computer readable medium comprising code operable to:
- receive destination information from a user, the destination information comprising a desired destination of the user;
- determine a first route to the destination;
- communicate the first route to the user;
- monitor position information of a plurality of vehicles;
- identify an area causing traffic delay using the position information of the plurality of vehicle;
- determine a second route to the destination to avoid the area;
- communicate the second route to the user;
- communicate to a number of users respective routes that include the area causing traffic delay; and
- monitor position information of the number of users to determine when traffic delay is reduced in the area.

48. Software embodied in a computer readable medium, the computer readable medium comprising code operable to:
- receive destination information from a user, the destination information comprising a desired destination of the user;
- determine a first route to the destination;
- communicate the first route to the user;
- monitor position information of a plurality of vehicles;
- identify an area causing traffic delay using the position information of the plurality of vehicle;
- determine a second route to the destination to avoid the area;
- communicate the second route to the user;
- monitor position information of a second plurality of vehicles;
- determine when the traffic delay is reduced in the area using the position information of the second plurality of vehicles;
- update the second route to the destination to include the area; and
- communicate the updated second route to the user.

49. Software embodied in a computer readable medium, the computer readable medium comprising code operable to:
- receive destination information from a user, the destination information comprising a desired destination of the user;
- determine a first route to the destination;
- communicate the first route to the user;
- monitor position information of a plurality of vehicles;
- identify an area causing traffic delay using the position information of the plurality of vehicle;
- determine a second route to the destination to avoid the area;
- communicate the second route to the user;
- receive second destination information from a second user, the second destination information comprising a desired destination of the second user;
- determine a third route to the second destination;
- communicate the third route to the second user;
- determine a fourth route to the second destination to avoid the area; and
- prioritize when to communicate the second route to the user or the fourth route to the second user based on respective positions of the user and the second user.

50. A method for communicating navigation information, comprising:
- receiving destination information from a user, the destination information comprising a desired destination of the user;
- determining a first route to the destination;
- communicating the first route to the user;
- monitoring position information of a plurality of vehicles;
- identifying an area causing traffic delay using the position information of the plurality of vehicles based on route diversions of the plurality of vehicles;
- determining a second route to the destination to avoid the area when a threshold amount of route diversions of the plurality of vehicles are identified; and
- communicating the second route to the user.

51. The method of claim 50, further comprising:
- monitoring position information of a second plurality of vehicles;
- determining when the traffic delay is reduced in the area using the position information of the second plurality of vehicles;
- updating the second route to the destination to include the area; and
- communicating the updated second route to the user.

52. The method of claim 50, further comprising:
- receiving second destination information from a second user, the second destination information comprising a desired destination of the second user;
- determining a third route to the second destination;
- communicating the third route to the second user;
- determining a fourth route to the second destination to avoid the area; and
- prioritizing when to communicate the second route to the user or the fourth route to the second user based on respective positions of the user and the second user.

53. A system for displaying navigation information, comprising:
- a mobile navigation system comprising an interface operable to receive destination information from a user, the destination information comprising a desired destination of the user;
- the mobile navigation system operable to determine a first route to the destination;
- the interface further operable to communicate the first route to the user;
- a central navigation server wirelessly coupled with the mobile navigation system, the central navigation server operable to:
  - monitor position information of a plurality of vehicles;
  - identify an area causing traffic delay based on route diversions of the plurality of vehicles using the position information of the plurality of vehicles; and
  - communicate to the mobile navigation system parameters relating to the area causing traffic delay;
- the mobile navigation system operable to determine a second route to the destination to avoid the area based on the parameters; and
- the interface further operable to communicate the second route to the user.

54. The system of claim 53, wherein the central navigation server is operable to communicate the parameters when a threshold amount of route diversions of the plurality of vehicles are identified.

55. The system of claim 53, wherein a central navigation server operable to identify an area causing traffic delay using the position information of the plurality of vehicles comprises a central navigation server operable to identify an area causing traffic delay based on speed of the plurality of vehicles.

56. The system of claim 53, wherein the second route comprises a modification of the first route.

57. The system of claim 53, wherein the area causing traffic delay comprises a construction area.

58. The system of claim 53, wherein the area causing traffic delay comprises a traffic accident.

59. The system of claim 53, wherein the area causing traffic delay comprises at least a temporary closure of at least a portion of a road.

60. A system for displaying navigation information, comprising:
a mobile navigation system comprising an interface operable to receive destination information from a user, the destination information comprising a desired destination of the user;
the mobile navigation system operable to determine a first route to the destination;
the interface further operable to communicate the first route to the user;
a central navigation server wirelessly coupled with the mobile navigation system, the central navigation server operable to:
monitor position information of a plurality of vehicles;
identify an area causing traffic delay using the position information of the plurality of vehicles; and
communicate to the mobile navigation system parameters relating to the area causing traffic delay;
the mobile navigation system operable to determine a second route to the destination to avoid the area based on the parameters;
the interface further operable to communicate the second route to the user;
a plurality of additional mobile navigation systems each operable to communicate to a number of users respective routes that include the area causing traffic delay; and
wherein the central navigation server is operable to monitor position information of the number of users to determine when traffic delay is reduced in the area.

61. A system for displaying navigation information, comprising:
a mobile navigation system comprising an interface operable to receive destination information from a user, the destination information comprising a desired destination of the user;
the mobile navigation system operable to determine a first route to the destination;
the interface further operable to communicate the first route to the user;
a central navigation server wirelessly coupled with the mobile navigation system, the central navigation server operable to:
monitor position information of a plurality of vehicles;
identify an area causing traffic delay using the position information of the plurality of vehicles; and
communicate to the mobile navigation system parameters relating to the area causing traffic delay;
the mobile navigation system operable to determine a second route to the destination to avoid the area based on the parameters;
the interface further operable to communicate the second route to the user;
the central navigation server is operable to;
monitor position information of a second plurality of vehicles;
determine when the traffic delay is reduced in the area using the position information of the second plurality of vehicles; and
communicate to the mobile navigation system that traffic delay is reduced in the area;
the mobile navigation system is further operable to update the second route to the destination to include the area; and
the interface is operable to communicate the updated second route to the user.

62. A method for communicating navigation information, comprising:
receiving destination information from a user, the destination information comprising a desired destination of the user;
determining a first route to the destination;
communicating the first route to the user;
monitoring position information of a plurality of vehicles;
identifying an area improving traffic flow using the position information of the plurality of vehicles;
determining a second route to the destination to include the area; and
communicating the second route to the user.

63. The method of claim 62, wherein identifying an area improving traffic flow using the position information of the plurality of vehicles comprises identifying an area improving traffic flow based on route diversions of the plurality of vehicles.

64. The method of claim 62, wherein the second route comprises a modification of the first route.

65. The method of claim 62, wherein the area improving traffic flow comprises an opening of a roadway.

* * * * *